United States Patent [19]

Feldman

[11] 3,978,756

[45] Sept. 7, 1976

[54] GUITAR INSTRUCTION SYSTEM

[75] Inventor: Jerome M. Feldman, Great Neck, N.Y.

[73] Assignee: Hi-Tech Industries, Incorporated, Jamaica, N.Y.

[22] Filed: Aug. 25, 1975

[21] Appl. No.: 607,678

[52] U.S. Cl. .................................... 84/470; 84/314; 84/471 R; 84/472; 84/485 R

[51] Int. Cl.[2] .......................................... G09B 15/00

[58] Field of Search ............. 84/470, 471, 472, 485, 84/314

[56] References Cited

UNITED STATES PATENTS

| | | | |
|---|---|---|---|
| 357,168 | 2/1887 | Barnwell | 84/314 |
| 793,247 | 6/1905 | Thomas | 84/177 |
| 1,699,380 | 1/1929 | Stewart | 84/314 |
| 3,724,097 | 4/1973 | Schmoyer | 84/470 |
| 3,785,240 | 1/1974 | Hill | 84/485 |
| 3,820,434 | 6/1974 | Roberts | 84/485 |

*Primary Examiner*—Stephen J. Tomsky
*Attorney, Agent, or Firm*—Pennie & Edmonds

[57] ABSTRACT

An instruction system for a string instrument such as a guitar comprising note indicia underlying the strings of the guitar along the fingerboard and adjacent to the frets, a music sheet containing the musical exercise to be practiced, a holder for supporting the music sheet on the fingerboard of the guitar, and a mirror adapted to be positioned in front of the student through which the fingerboard and music sheet can be viewed. The note indicia on the fingerboard of the guitar as well as the musical exercise on the music sheet are written in reverse, that is, from right to left. In addition, the area of the fingerboard underlying the respective strings of the guitar and the notes of the musical exercise on the music sheet are color coded so that the musical exercise indicates to the student which string is to be used in producing the required note.

10 Claims, 5 Drawing Figures

GUITAR INSTRUCTION SYSTEM

BACKGROUND OF THE INVENTION

The beginning student, in learning how to play a stringed instrument such as a guitar, is confronted with several problems. Quite often, he must first familiarize himself with the parts of the guitar and may often have to familiarize himself with the construction of sheet music. In addition, it is usually necessary to learn how to properly hold the guitar and how to properly position and use one's fingers to press the appropriate guitar strings against the frets. Without using any mechanical aids, the beginning student relies on both his visual and tactile senses. In the normal situation, the student places the music sheet, containing the exercise to be practiced, in front of him. He next determines from the exercise which note or notes are to be played and then moves his fingers to the appropriate string and fret position. Obviously, with the beginning student, the finger placement requires visual observation of the guitar fingerboard; and each time a new note must be obtained, the student is required to look back and forth between the music sheet and the guitar.

In the past, various mechanical aids have been suggested for assisting the beginning student in learning how to play the stringed instrument. In some systems, the fingerboard of the guitar may simply be provided with coloring to assist in distinguishing the different positions of the strings. Representative patents showing structures of this type are U.S. Pat. Nos. 357,168, 1,699,380 and 3,820,434. In other constructions, instruction cards may be attached directly to the guitar with or without using color for further instructive assistance. Patents disclosing structures of this type are U.S. Pat. Nos. 826,379, 3,218,904 and 3,785,240.

Although the prior approaches may be of some assistance to the beginning student, they do have certain drawbacks in common with each other. All of the systems, regardless of their simplicity or complexity, require the student to shift back and forth between viewing music in front of him to observing the fingerboard of the guitar being held. In addition, the more complicated instructive aids are cumbersome in that they include structure, in addition to the normal sheet music, which must be manipulated as the lesson progresses. This manipulation, by being in addition to simple fingering of the guitar strings, tends to further complicate rather than simplify the learning procedure.

SUMMARY OF THE PRESENT INVENTION

In accordance with the teachings of the present invention, applicant has devised an instruction system which is exceedingly simple as far as the student is concerned, while at the same time providing a correlation between the musical exercise and the finger positioning of the fingers on the guitar strings. This correlation enables the student to read the musical exercise and at the same time finger the guitar strings with a minimum effort and distraction. With the system of the present invention, the student, while learning to play the guitar, readily gains familiarity with both the reading of musical scores and the location of the notes and frets on the guitars. This is of especial advantage where the beginning student has not previous experience in music and must not only learn how to handle a guitar, but at the same time, learn how to read conventional musical scores.

In construction, applicant's system includes removable labels which are adapted to be placed on the fingerboard of the guitar. These labels contain the letter notes produced by each guitar string at each fret location. The letter notes are all written in reverse and are not adapted to be read directly by the student. In addition to the letter notes on the guitar fingerboard, music sheets containing the musical exercises are provided; and in each exercise, the music is written in reverse. As with the note instructions on the fingerboard of the guitar, the musical exercise is not to be read directly. In accordance with applicant's system, the music sheet is attached to the fingerboard of the guitar; and for purposes of reading it and the note indicia on the guitar, a mirror is provided. This mirror is positioned in front of the student.

In practicing with the guitar, the student views both the music and the fingerboard of the guitar in the mirror. In addition, the mirror provides a view of his own fingers as they are moved to press the guitar strings in accordance with the instructions of the musical exercise. It is not necessary for the student to switch back and forth between viewing of a music sheet and the guitar fingerboard. Everything that need be viewed is shown at one location, that is in the mirror.

DESCRIPTION OF THE PREFERRED EMBODIMENT

Figure 1:
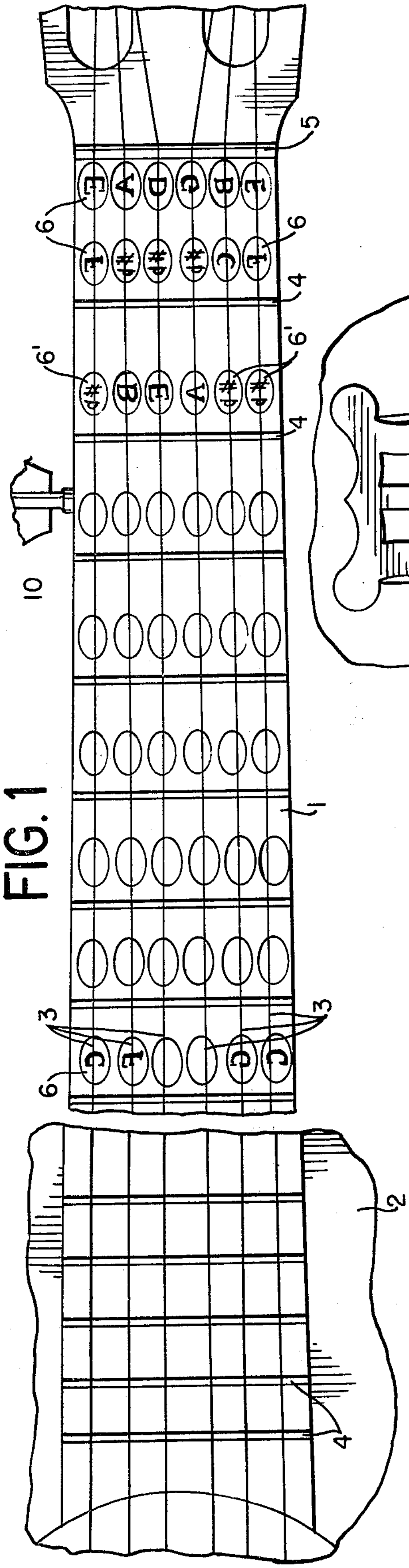
FIG. 1 is a view of a portion of the fingerboard of a guitar incorporating the system of the present invention.

FIG. 1 shows the fingerboard 1 of a conventional guitar 2 having six strings 3. The frets and the nut of the fingerboard are shown at 4 and 5, respectively. In accordance with the teachings of the present invention, letter note indicia 6 are placed under the strings and adjacent the frets. Each letter note indicia represents the note that will be produced by the overlying string when depressed against the fret which is adjacent to the indicia. The note indicia underlie each string at a location adjacent to the frets. and at the precise location where the student is to depress the string to produce the designated note. For normal instruction and playing of the guitar, it is not necessary to show each note adjacent each fret. Only those in the normal fingering area of the guitar fingerboard are required. In addition to the note indicia adjacent each of the frets, note indicia is also provided adjacent the nut 5. These indicia indicate the notes produced when the overlying strings are in the open position. As will be observed from FIG. 1, each note indicia 6 is printed in reverse. Similarly, the sharp and flat notations 6′ are printed in reverse.

Figure 2:
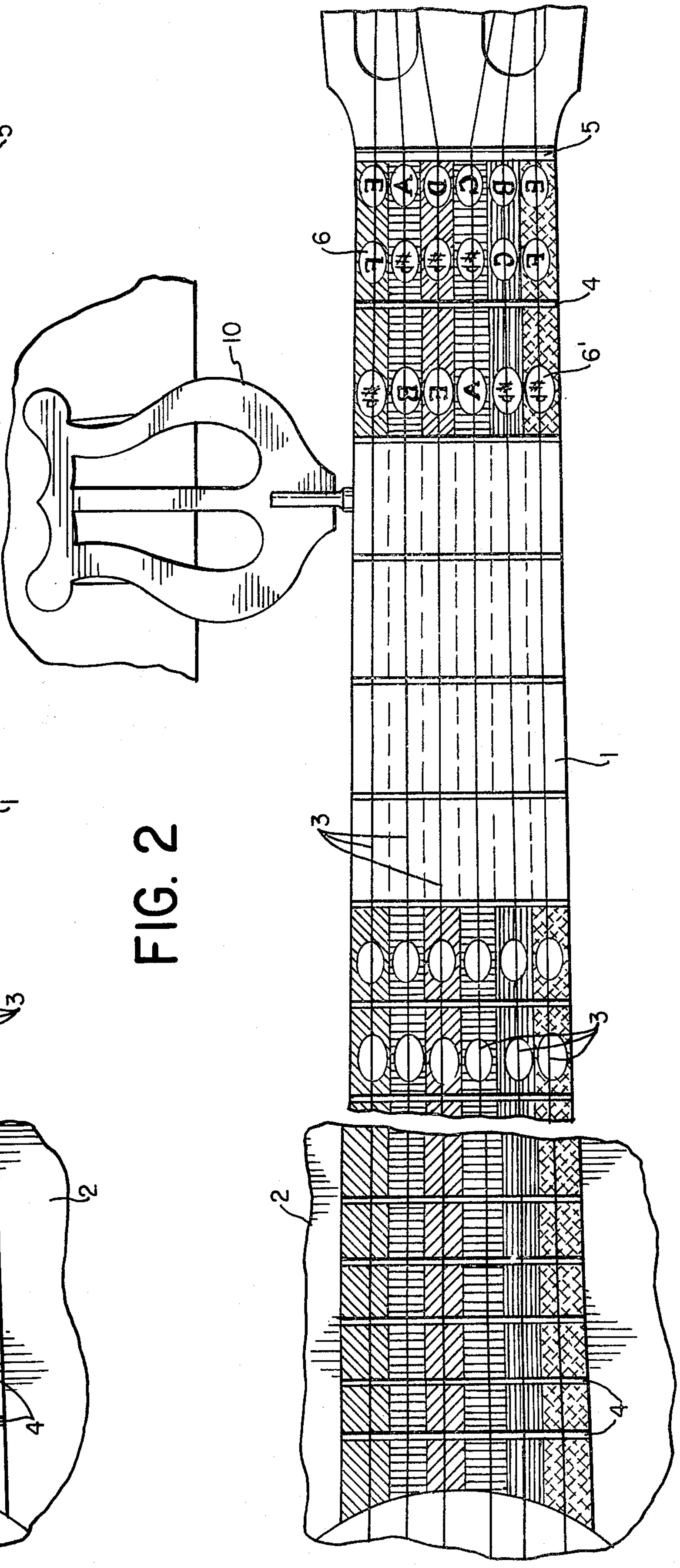
FIG. 2 is a portion of the fingerboard of a guitar showing a further embodiment of the present invention.

Referring to FIG. 2, a further embodiment of the invention is shown. Here the portions of the fingerboard underlying each of the strings are colored with a different color. The coloring underlies the note indicia 6 and extends the full length of the fingerboard. The different colors are shown in FIG. 2 by different cross-sectioning of the fingerboard. In the preferred embodiment, the strings are colored as follows:

| | |
|---|---|
| First string | Orange |
| Second string | Blue |
| Third string | Red |
| Fourth string | Green |
| Fifth string | Lavender |
| Sixth string | Brown |

Figure 3:
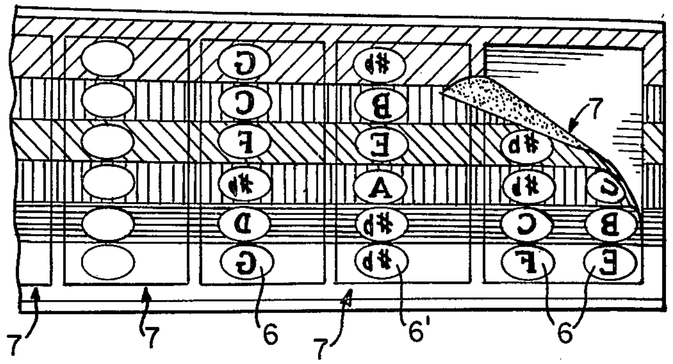
FIG. 3 is a view showing the construction of separate label sections for containing note indicia for use in the system of the present invention.

The coloring and note indicia are provided on removable labels 7. As shown in FIG. 3, the labels are constructed in sections for placement between each of the frets. Also, one section with a double line of letter notes is provided for attachment between the nut and first fret of the guitar. Each label section is a one-piece construction and adapted to be releasably secured to the fingerboard in position underlying the strings.

Figure 4:
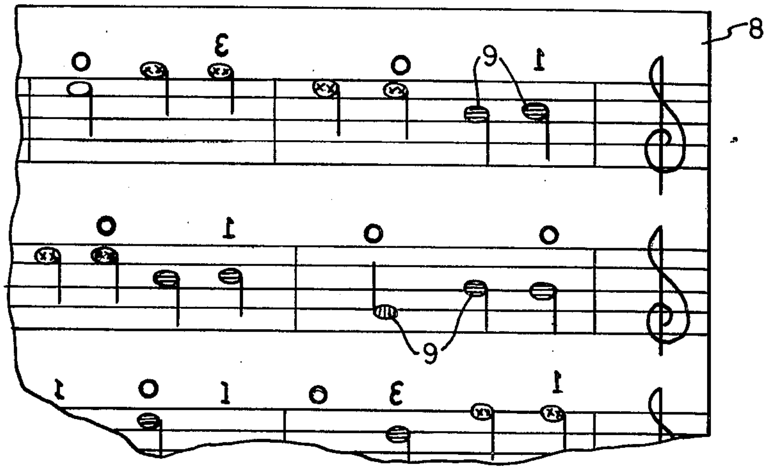
FIG. 4 is a view of a portion of a musical exercise constructed in accordance with the teachings of the present invention.

FIG. 4 shows a score sheet 8 containing a musical exercise. In accordance with the teachings of the present invention, the musical exercise is written in reverse and adapted to be read from right to left. In addition to the notes 9 as contained on the music sheet, letter indicia are provided for some or all of the notes. In any case, such indicia, where used, will be written in reverse as indicated in FIG. 4.

As a further instructive assistance to the beginning student, the fingering sequence to be used with the particular notes of the musical exercise are shown on the music sheet. The number indicia is, of course, written in reverse. In the exercise of FIG. 4, the first, third and fifth notes of the score are numbered 1, 0 and 3. This indicates that the first and third fingers are to be used in producing the adjacent note. The 0 over the third note, on the other hand, indicates that this note is to be played in open position.

As a still further instructive aid to the student, the individual notes of the musical exercise are colored with the coloring being correlated to the particular string which is to be used in producing the note on the guitar. In this regard, it will be observed that the first two notes of the score are colored blue. This instructs the student to produce these notes on the string of the guitar overlying the blue coloring of the fingerboard. This is the second string. The coloring of the notes eliminates any choice that might otherwise be given to the student as is the case with conventional music. Thus, for example, where a particular note can be played by either of several strings of a guitar, the coloring of the note on the musical exercise will remove the choice and porperly instruct the student.

In order to correlate the fingerboard of the guitar with the musical exercise and with the student's fingers, a music stand 10 and mirror 11 are provided. As shown in FIG. 1, the stand 10 is fixed to the fingerboard of the guitar so as to be located on the upper side of the fingerboard when the guitar is held in the normal playing position. The stand 10 may be of conventional construction and provided with a threaded end adapted to thread into the similarly formed opening in the fingerboard of the guitar. The stand 10 is used to hold the music sheet 8 adjacent the portion of the fingerboard where the normal fingering will occur. When in position, the music sheet faces away from the student as the guitar is held in the normal playing position.

Figure 5:
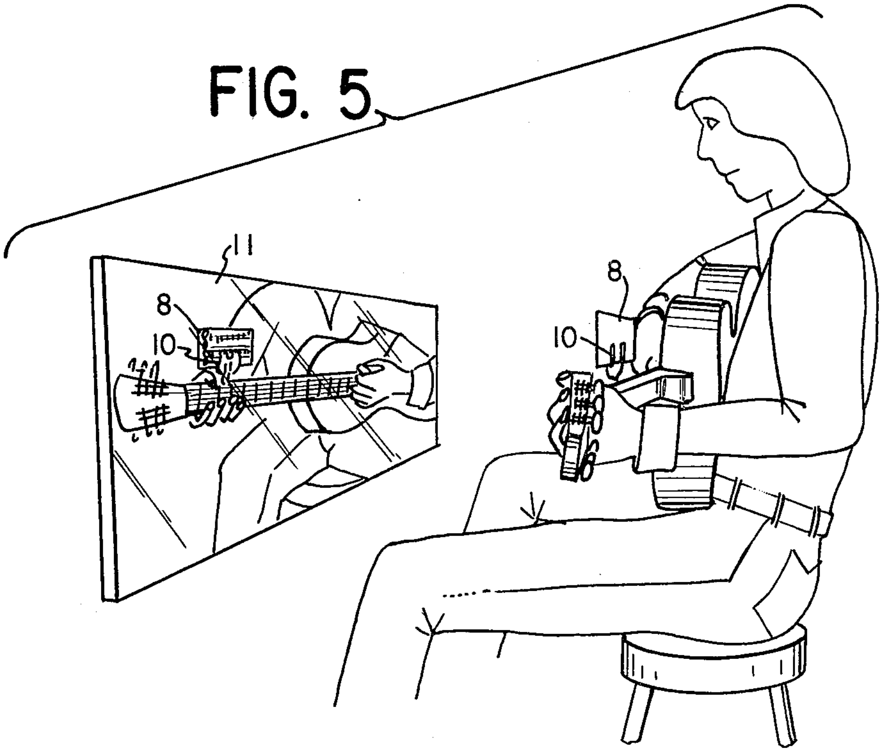
FIG. 5 is a view showing the system in use.

As shown in FIG. 5, the mirror 11 effectively connects the various parts of the system together. it is adapted to be positioned in front of the student as he holds the guitar in normal playing position. Looking into the mirror, the student will see the musical score and all indicia both in the musical exercise and on the fingerboard of the guitar in normal reading orientation. He will also be able to view the manipulation of his fingers as he plays the guitar and will not need to switch his view back and forth between the musical exercise and the guitar to ascertain if he is handling the guitar properly. A mirror of about size 18 × 36 inches placed about 1½ feet in front of the student provides the necessary viewing area so that everything necessary for instructive purposes can be viewed at one location.

In addition to the note instruction, the coloring of the entire length of the fingerboard of the guitar all the way to the sound hole where the picking of the strings is to occur, enables the student to quickly ascertain which string is to be picked after pressing of the string in accordance with the directions of the musical exercise.

The above description has been made with respect to a right handed guitar. Of course, it is to be understood that the instructive system of the present invention is equally suited for use with left handed guitars. In such a case, it is only necessary to properly arrange the note indicia with the appropriate strings of the guitar.

I claim:

1. A guitar instruction system for students learning to play the guitar, said system comprising:

a. a guitar having note indicia adjacent at least some of the frets of the guitar and underlying each of the guitar strings, each of said indicia specifying the letter note of the overlying string when depressed against the adjacent fret, each of said letter notes being written in reverse;

b. a music sheet containing the instructive musical exercise to be practiced, said exercise showing the staff and the notes written in reverse, from right to left on the staff;

c. a holder for said music sheet fixed to the fingerboard of the guitar for holding the music sheet in upright position and facing away from the student when the guitar is held in the normal playing position; and d. a mirror for positioning in front of the student and in which the student may observe simultaneously both the music sheet and the fingerboard of the guitar with all indicia appearing in normal orientation for normal reading by the student.

2. A guitar instruction system according to claim 1 further including:

a. note indicia adjacent the nut of the guitar and underlying the guitar strings, each of said indicia specifying the letter note of the overlying string when in open position; each of said letter notes being written in reverse.

3. A guitar instruction system according to claim 2 wherein:

a. the holder for the music sheet is fixed to the fingerboard adjacent the tuning end of the guitar for orientation above the fingerboard when the guitar is held in the normal playing position.

4. A guitar instruction system according to claim 2 wherein:

a. each note indicia is contained on the fingerboard of the guitar immediately adjacent the fret to which it relates at the point where the student is to press the overlying string against the fret.

5. A guitar instruction system according to claim 4 wherein:

a. said note indicia is contained on removable labels adhered to the fingerboard of the guitar.

6. A guitar instruction system according to claim 4 including:

a. a removable label covering the entire area of the keyboard between each fret and having a different color under each string of the guitar, each color extending the full length of the fingerboard; and b. said note indicia being contained on said labels.

7. A guitar instruction system according to claim 6 wherein:

a. the coloring of the keyboard extends the entire length thereof.

8. A guitar instruction system according to claim 5 wherein:

a. the music sheet further includes letter indicia for at least some of the notes, said indicia being shown in reverse adjacent the notes to which it relates.

9. A guitar instruction system according to claim 5 wherein:

a. the music sheet further includes number indicia for at least some of the notes representing the finger to be used to depress the different guitar strings, said number indicia each being shown in reverse adjacent the notes to which it relates.

10. A guitar instruction system according to claim 5 wherein:

a. the notes on the music sheet each have a color corresponding to the color underlying the string on which the note is to be played.

* * * * *